(12) United States Patent
Nomura et al.

(10) Patent No.: US 12,498,733 B2
(45) Date of Patent: Dec. 16, 2025

(54) INFORMATION PROCESSING APPARATUS, INFORMATION PROCESSING METHOD, INFORMATION PROCESSING SYSTEM, AND COMPUTER READABLE MEDIUM

(71) Applicant: NEC Corporation, Tokyo (JP)

(72) Inventors: Takuya Nomura, Tokyo (JP); Takuya Hisamoto, Tokyo (JP); Kenichi Kijima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 204 days.

(21) Appl. No.: 18/278,318

(22) PCT Filed: Jan. 13, 2022

(86) PCT No.: PCT/JP2022/000975
§ 371 (c)(1),
(2) Date: Aug. 22, 2023

(87) PCT Pub. No.: WO2022/209133
PCT Pub. Date: Oct. 6, 2022

(65) Prior Publication Data
US 2024/0118699 A1 Apr. 11, 2024

(30) Foreign Application Priority Data
Mar. 31, 2021 (JP) .................. 2021-062052

(51) Int. Cl.
| G05D 1/222 | (2024.01) |
| G08G 1/00 | (2006.01) |
| G08G 5/34 | (2025.01) |

(52) U.S. Cl.
CPC .................. *G05D 1/222* (2024.01)

(58) Field of Classification Search
CPC .. G08G 1/00; G08G 5/20; G08G 5/26; G08G 5/34; G08G 5/76
See application file for complete search history.

(56) References Cited

U.S. PATENT DOCUMENTS

| 2018/0268723 A1* | 9/2018 | Sugaya ..................... G08G 5/76 |
| 2019/0164434 A1* | 5/2019 | Cantaloube .............. G08G 5/26 |

(Continued)

FOREIGN PATENT DOCUMENTS

| CN | 112037584 A | 12/2020 |
| JP | 2016-220401 A | 12/2016 |

(Continued)

OTHER PUBLICATIONS

International Search Report for PCT Application No. PCT/JP2022/000975, mailed on Mar. 1, 2022.

(Continued)

*Primary Examiner* — Yuri Kan

(57) ABSTRACT

An information processing apparatus includes at least one memory storing instructions, and at least one processor. The at least one processor is configured to execute instructions to receive request information including qualification information regarding an operation qualification for operating a mobile body and plan information regarding an operation plan for operating the mobile body, acquire attribute information of the qualification information, determine whether or not to accept a request associated with the request information based on the attribute information, and output a result of the determination regarding the request as a response to the request.

19 Claims, 12 Drawing Sheets

(56) References Cited

U.S. PATENT DOCUMENTS

2020/0090525 A1* 3/2020 Krishnamoorthy ...... G08G 5/34
2021/0097870 A1* 4/2021 Nakadai ................... G08G 5/20

FOREIGN PATENT DOCUMENTS

| JP | 2019-032661 A | 2/2019 |
| JP | 2019-133704 A | 8/2019 |
| WO | 2017/115807 A1 | 7/2017 |
| WO | 2018/020607 A1 | 2/2018 |

OTHER PUBLICATIONS

JP Office Action for JP Application No. 2023-510293, mailed on Feb. 18, 2025 with English Translation.

\* cited by examiner

REMOTE IDENTIFICATION INFORMATION

| BODY INFORMATION | ADMINISTRATOR INFORMATION | USER INFORMATION |
|---|---|---|
| DYNAMIC INFORMATION | DYNAMIC INFORMATION | DYNAMIC INFORMATION |
| TOTAL MOVING TIME | BODY OPERATION ACHIEVEMENT | MOVEMENT ACHIEVEMENT |
| REPAIR HISTORY | NUMBER OF BODIES | ACCIDENT HISTORY |
| ⋮ | ⋮ | ⋮ |
| STATIC INFORMATION | STATIC INFORMATION | STATIC INFORMATION |
| VALIDITY PERIOD | VALIDITY PERIOD | VALIDITY PERIOD |
| BODY NUMBER | NAME OR TITLE | NAME |
| WEIGHT | ADDRESS OR LOCATION | ADDRESS |
| ⋮ | ⋮ | ⋮ |

Fig. 7

INFORMATION PROCESSING APPARATUS, INFORMATION PROCESSING METHOD, INFORMATION PROCESSING SYSTEM, AND COMPUTER READABLE MEDIUM

This application is a National Stage Entry of PCT/JP2022/000975 filed on Jan. 13, 2022, which claims priority from JP Patent Application 2021-062052 filed on Mar. 31, 2021, the contents of all of which are incorporated herein by reference, in their entirety.

TECHNICAL FIELD

The present invention relates to an information processing apparatus, an information processing method, an information processing system, and a computer readable medium.

BACKGROUND ART

Mobile bodies such as drones, autonomous robots, or self-driving vehicles that move autonomously or by remote control have become more and more widespread. Further, it is expected that a technique for safely operating these mobile bodies will be developed.

For example, a technique for managing a flying state of a flying object and managing a flying object manipulator who manipulates the flying object is disclosed (Patent Literature 1).

Further, a technique for dividing a management area into a plurality of areas, determining, for each area, whether or not an unmanned aircraft can fly through each area, and designing a flying route of the unmanned aircraft in such a way that the unmanned aircraft passes through an area where it is allowed to fly determined by the flying area determination unit is disclosed (Patent Literature 2).

CITATION LIST

Patent Literature

[Patent Literature 1] Japanese Unexamined Patent Application Publication No. 2019-133704
[Patent Literature 2] Japanese Unexamined Patent Application Publication No. 2019-032661

SUMMARY OF INVENTION

Technical Problem

The aforementioned techniques indicate aspects for managing an operation plan for operating a mobile body. However, it is required that the operation plan for operating the mobile body be efficiently managed in view of situations of a society or the like.

The present disclosure has been made in view of the aforementioned problem, and an object of the present disclosure is to provide an information processing apparatus, an information processing method, an information processing system, and a program for suitably processing information regarding an operation plan for operating a mobile body.

Solution to Problem

An information processing apparatus according to one example embodiment of the present disclosure includes a request information receiving unit, an attribute information acquisition unit, a determination unit, and an output unit. The request information receiving unit receives request information including qualification information regarding an operation qualification for operating a mobile body and plan information regarding an operation plan for operating the mobile body. The attribute information acquisition unit acquires attribute information of the qualification information. The determination unit determines whether or not to accept a request associated with the request information based on the attribute information. The output unit outputs a result of the determination regarding the request as a response to the request.

In an information processing method according to one example embodiment of the present disclosure, a computer executes the following method. The computer receives request information including qualification information regarding an operation qualification for operating a mobile body and plan information regarding an operation plan for operating the mobile body. The computer acquires attribute information of the qualification information. The computer determines whether or not to accept a request associated with the request information based on the attribute information. The computer outputs a result of the determination regarding the request as a response to the request.

A program according to one example embodiment of the present disclosure causes a computer to execute the following steps. The computer receives request information including qualification information regarding an operation qualification for operating a mobile body and plan information regarding an operation plan for operating the mobile body. The computer acquires attribute information of the qualification information. The computer determines whether or not to accept a request associated with the request information based on the attribute information. The computer outputs a result of the determination regarding the request as a response to the request.

Advantageous Effects of Invention

According to the present disclosure, it is possible to provide an information processing apparatus, an information processing method, an information processing system, and a program for suitably processing information regarding an operation plan for operating the mobile body.

BRIEF DESCRIPTION OF DRAWINGS

FIG. 7 is a diagram showing an example of a remote identification information.

EXAMPLE EMBODIMENT

Hereinafter, the present disclosure will be described based on embodiments of the present disclosure. However, the disclosure set forth in claims is not limited to the following embodiments. Moreover, it is not absolutely necessary to provide all the configurations to be described in the following embodiments as means for solving the problems. For the sake of clarification of the description, the following description and the drawings are partially omitted and simplified as appropriate. Throughout the drawings, the same symbols are attached to the same elements and overlapping descriptions are omitted as necessary.

First Example Embodiment

Figure 1:
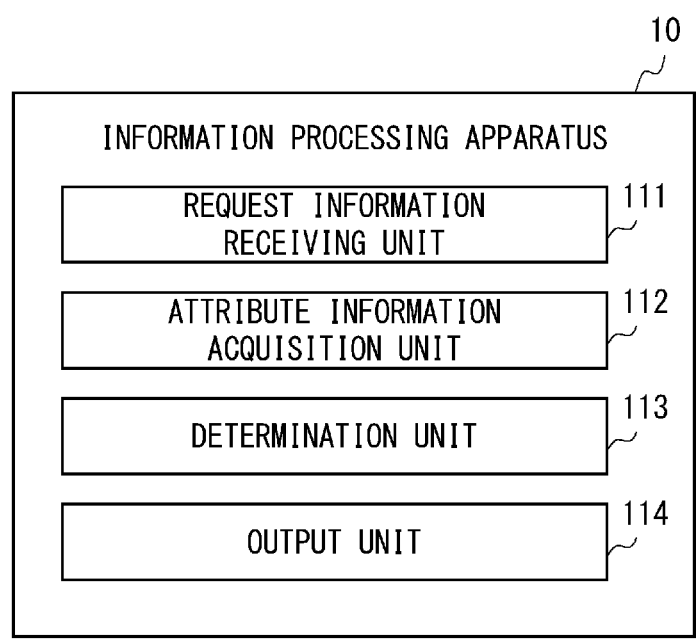
FIG. 1 is a block diagram of an information processing apparatus according to a first example embodiment.

Hereinafter, with reference to the drawings, example embodiments will be described. FIG. 1 is a block diagram of an information processing apparatus according to a first example embodiment. An information processing apparatus shown in FIG. 1 is connected to, for example, a computer held by an administrator who manages a mobile body in such a manner that they can communicate with each other. The information processing apparatus 10 receives a request including an operation plan from the administrator via this computer. Further, the information processing apparatus 10 determines whether or not to accept this request, and transmits a result of this determination to the administrator. Note that a person who makes a request including an operation plan may be referred to as a requester.

The mobile body in the present disclosure is, for example, a mobile body that moves by remote manipulation or a mobile body that autonomously moves under a predetermined control. More specifically, the mobile body may include a flying object, a self-driving car, an autonomous mobile robot, or a ship, a construction vehicle, a walking robot or the like that moves autonomously or by remote control. The aforementioned flying object is, for example, an unmanned aircraft (unmanned aerial vehicle (UAV)), a flying car, or the like. Further, the above flying object may be a Vertical Take-Off and Landing Aircraft (Vtol) or an electric VTOL (eVTOL). The flying object may also be a tilt-rotor aircraft. The aforementioned flying object may be a helicopter. Further, while the aforementioned flying object may include, for example, a rotor wing, it is merely an example and the flying object may be the one that can fly by autonomous control. Further, the aforementioned mobile body may or may not be required to have a manipulator on board, or may or may not be able to have a manipulator on board.

The information processing apparatus 10 mainly includes a request information receiving unit 111, an attribute information acquisition unit 112, a determination unit 113 and an output unit 114.

The request information receiving unit 111 receives request information. The request information is information that a requester transmits to the information processing apparatus 10 via the aforementioned computer or the like. The request information includes qualification information regarding an operation qualification for operating a mobile body and plan information regarding an operation plan for operating the mobile body.

The qualification information is information regarding a qualification that is necessary to operate a mobile body. Such a qualification includes, for example, a qualification or a license (a usage qualification) for manipulating or using the aforementioned mobile body, a qualification (a management qualification) for owning or managing the mobile body, or a qualification (an operation qualification) regarding an operation permission for operating the mobile body itself. The usage qualification for manipulating or using the mobile body is granted to a user (the user may also be called a manipulator). The management qualification for owning or managing the mobile body is granted to an administrator. The operation qualification for operating the mobile body itself is granted to the mobile body.

The operation plan is information regarding a plan for actually operating the mobile body. Such information includes, for example, the date and time when the mobile body is operated, a period in which the mobile body is operated, a place where the mobile body is operated, a purpose or the like for operating the mobile body. The operation plan is also referred to as a flight plan, a travel plan, a transport plan, a navigation plan, a moving plan, or the like depending on the aspect of the mobile body.

The attribute information acquisition unit 112 acquires attribute information of the qualification information associated with request information. The attribute information acquisition unit 112 acquires this attribute information from, for example, an attribute information management apparatus to which the information processing apparatus 10 is connected in such a manner that they can communicate with each other. The attribute information management apparatus, which stores attribute information, may be separated from the information processing apparatus 10 or may be included in the information processing apparatus 10.

The attribute information of the qualification information includes dynamic information associated with the aforementioned qualification information. The dynamic information is information that may be updated every time the mobile body is operated. This attribute information is used by the information processing apparatus 10 when it determines whether or not to accept an operation plan. The attribute information includes, for example, user experience hours, an accident history, or a training attendance status related to the usage qualification. The attribute information further includes, for example, the number of mobile bodies owned by an administrator, or an accident history of a mobile body owned by the administrator related to the management qualification. The attribute information further includes, for example, an operation time, a failure history, a repair history or the like regarding a mobile body. The attribute information may include, besides the aforementioned dynamic information, static information in the qualification information. The static information, which is information of the qualification information that is updated less frequently than the dynamic information is, includes, for example, the name or the property of the mobile body, the name or the title of the administrator, the user's name, and the like.

The determination unit 113 determines whether or not to accept the request associated with the request information from the received attribute information. The determination unit 113 determines, for example, whether or not the qualification information of the request information is valid. Further, the determination unit 113 determines whether or not it is possible to operate the mobile body at the date and time and in the region included in the plan information of the request information. For example, the determination unit 113 may determine whether or not it is possible to operate the mobile body in view of other plan information regarding another request made by another requester. The determination unit 113 further determines whether or not the content of the operation associated with the request information is within an appropriate range of the user, the administrator, or the mobile body regarding the attribute information from the request information and the attribute information.

It is assumed, for example, that a region where the mobile body is operated associated with the request information is a region where a predetermined limited manipulation skill is required. In this case, the determination unit 113 refers to information regarding the manipulation skill of the user included in the attribute information. Then, the determination unit 113 determines whether or not the user has this manipulation skill.

The output unit 114 outputs, as a response to the aforementioned request, the result of the determination regarding the request according to the determination made by the determination unit 113 to the requester.

Figure 2:
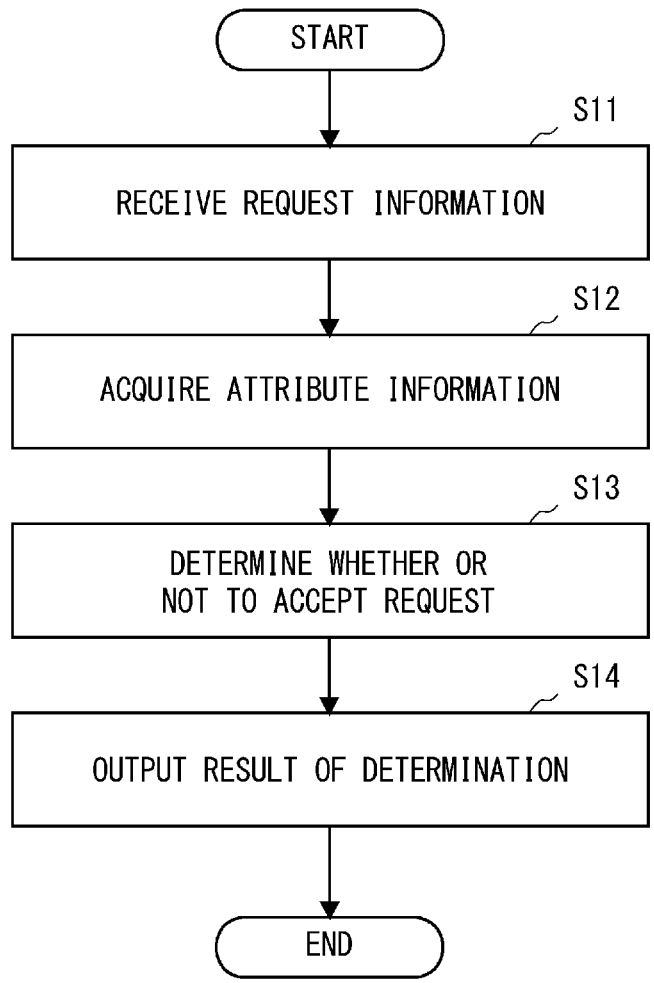
FIG. 2 is a flowchart of an information processing method according to the first example embodiment.

Referring next to FIG. 2, processing executed by the information processing apparatus will be described. FIG. 2 is a flowchart of an information processing method according to the first example embodiment. The flowchart shown in FIG. 2 is started, for example, when the information processing apparatus 10 is started.

First, the request information receiving unit 111 receives request information including qualification information regarding an operation qualification for operating a mobile body and plan information regarding an operation plan for operating the mobile body (Step S11). Upon receiving the request information, the request information receiving unit 111 supplies the received request information to the determination unit 113.

Next, the attribute information acquisition unit 112 acquires attribute information of the qualification information (Step S12). Upon receiving the attribute information, the attribute information acquisition unit 112 supplies the received attribute information to the determination unit 113.

Next, the determination unit 113 determines, based on the attribute information, whether or not to accept the request associated with the request information (Step S13). After determining whether or not to accept the request, the determination unit 113 supplies the result of the determination to the output unit 114.

Next, the output unit 114 outputs the result of the determination regarding the request as a response to the request (Step S14). After the output unit 114 outputs the result of the determination, the information processing apparatus 10 ends the series of processing.

The information processing apparatus 10 according to the first example embodiment has been described above. The information processing apparatus 10 includes, as components that are not shown, a processor and a storage apparatus. The storage apparatus included in the information processing apparatus 10 includes, for example, a storage apparatus including a non-volatile memory such as a flash memory or an SSD. In this case, the storage apparatus included in the information processing apparatus 10 stores a computer program (hereinafter it may also be simply referred to as a program) for executing the aforementioned image processing method. Further, the processor causes a computer program to be loaded to a buffer memory such as a Dynamic Random Access Memory (DRAM) from the storage apparatus, and executes this program.

Each of the components of the information processing apparatus 10 may be implemented by special-purpose hardware. Further, some or all of the components of each component may each be implemented by a general-purpose or special-purpose circuitry, processor, or a combination of them. They may be configured using a single chip, or a plurality of chips connected through a bus. Some or all of the components of each apparatus may be implemented by a combination of the above-described circuitry, etc. and a program. Further, a Central Processing Unit (CPU), a Graphics Processing Unit (GPU), a Field-Programmable Gate Array (FPGA), and so on may be used as a processor. The descriptions regarding the components described here may also be applied to other apparatuses or systems that will be described below in the present disclosure.

Further, when some or all of the components of the information processing apparatus 10 are implemented by a plurality of information processing apparatuses, circuits, or the like, the plurality of information processing apparatuses, the circuits, or the like may be disposed in one place in a centralized manner or arranged in a distributed manner. For example, the information processing apparatuses, the circuits, and the like may be implemented as a form such as a client-server system, a cloud computing system or the like in which they are connected to each other through a communication network. Further, the functions of the information processing apparatus 10 may be provided in the form of Software as a Service (SaaS).

The first example embodiment has been described above. According to the first example embodiment, it is possible to provide an information processing apparatus and an information processing method suitably processing information regarding an operation plan for operating the mobile body.

Second Example Embodiment

Figure 3:
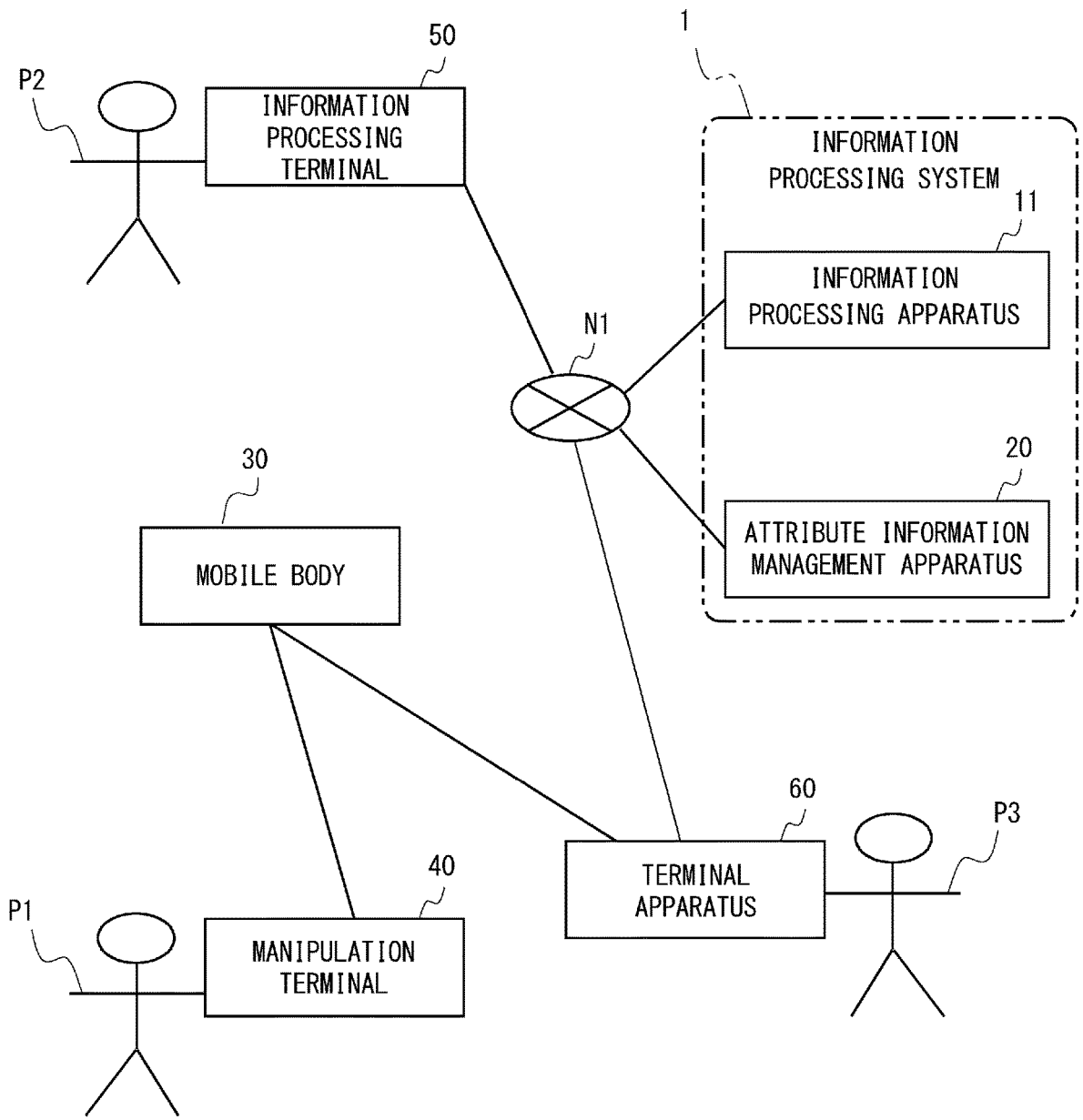
FIG. 3 is a block diagram of an information processing system according to a second example embodiment.

Next, a second example embodiment will be described. FIG. 3 is a block diagram showing a configuration of an information processing system according to the second example embodiment. The block diagram shown in FIG. 3 includes an information processing system 1, a mobile body 30, a manipulation terminal 40, an information processing terminal 50, and a terminal apparatus 60. Hereinafter, an outline of each component shown in FIG. 3 will be described.

The information processing system 1 shown in FIG. 3 is connected to the information processing terminal 50 via a network N1 in such a way that they can communicate with each other. The information processing system 1 receives request information from the information processing terminal 50. Further, the information processing system 1 determines, from the request information received from the information processing terminal 50, whether or not to accept this request, and outputs a result of the determination to the information processing terminal 50. The information processing system 1 includes an information processing apparatus 11 and an attribute information management apparatus 20.

Further, the information processing system 1 is connected to the terminal apparatus 60 held by a third party P3 via the network N1 in such a manner that they can communicate with each other and receives remote identification information of the mobile body 30 from the terminal apparatus 60. The "remote identification information" is one example aspect of qualification information according to the present disclosure. Upon receiving the remote identification information of the mobile body 30, the information processing system 1 is able to determine, from the received remote identification information, whether or not the mobile body 30 is operating according to a moving plan.

The information processing system 1 shown in FIG. 3 mainly includes the information processing apparatus 11 and the attribute information management apparatus 20. The information processing apparatus 11 and the attribute information management apparatus 20 are connected to each other via the network N1 in such a way that they can communicate with each other. The attribute information management apparatus 20 at least manages attribute information of the qualification information (remote identification information). The attribute information management apparatus 20 provides attribute information to be managed for the information processing apparatus 11 in accordance with the request from the information processing apparatus 11.

The mobile body 30, which is one example aspect of the mobile body according to the present disclosure, is an unmanned aircraft that can be remotely controlled. The mobile body 30 is one of a plurality of mobile bodies managed by an administrator P2. The mobile body 30 receives a predetermined instruction from the manipulation terminal 40 used by a user P1 and performs a motion such as a movement in accordance with the received instruction. The mobile body 30 transmits the remote identification information while moving for every predetermined time (e.g., every second). Further, the mobile body 30 may transmit, besides the remote identification information, information related to the state of the mobile body 30, such as time information, position information, or the like.

Here, an outline of the remote identification information will be described. The remote identification information, which is one example aspect of the qualification information, includes information that is necessary for the mobile body 30 to move, such as identification information on the mobile body 30 or information regarding a qualification or permission for allowing the mobile body 30 to be moved. Further, the remote identification information may include information such as position information of the mobile body 30 or a moving time. The mobile body 30 transmits the remote identification information to the information processing system 1 via the network N1.

The manipulation terminal 40, which is an apparatus for remotely controlling the mobile body 30, is able to send an instruction for causing the mobile body 30 to perform a predetermined motion via wireless communication. The manipulation terminal 40 may acquire data or the like of a sensor included in the mobile body 30.

The information processing terminal 50 is managed by the administrator P2 who manages and operates a plurality of mobile bodies including the mobile body 30, which is a mobile body. The administrator P2 sends a request including a moving plan using the information processing terminal 50. In other words, the information processing terminal 50 transmits predetermined request information to the information processing system 1 by an operation performed by the administrator P2. The moving plan includes plan information such as a purpose for moving the mobile body, a moving area where the mobile body moves, or a moving time when the mobile body moves. That is, the request information includes the plan information. Further, the information processing terminal 50 receives whether or not the moving plan that has been requested will be accepted from the information processing system 1.

The terminal apparatus 60 is, for example, a portable terminal having a communication function, such as a smartphone, a mobile telephone, or a tablet terminal. The terminal apparatus 60 receives signals sent from the mobile body 30. The signals sent from the mobile body 30 include remote identification information of the mobile body 30. The signals sent from the mobile body 30 may also include position information of the mobile body 30 or other information indicating the state of the mobile body 30. The terminal apparatus 60 transmits the remote identification information received from the mobile body 30 to the information processing system 1 via the network N1.

Figure 4:
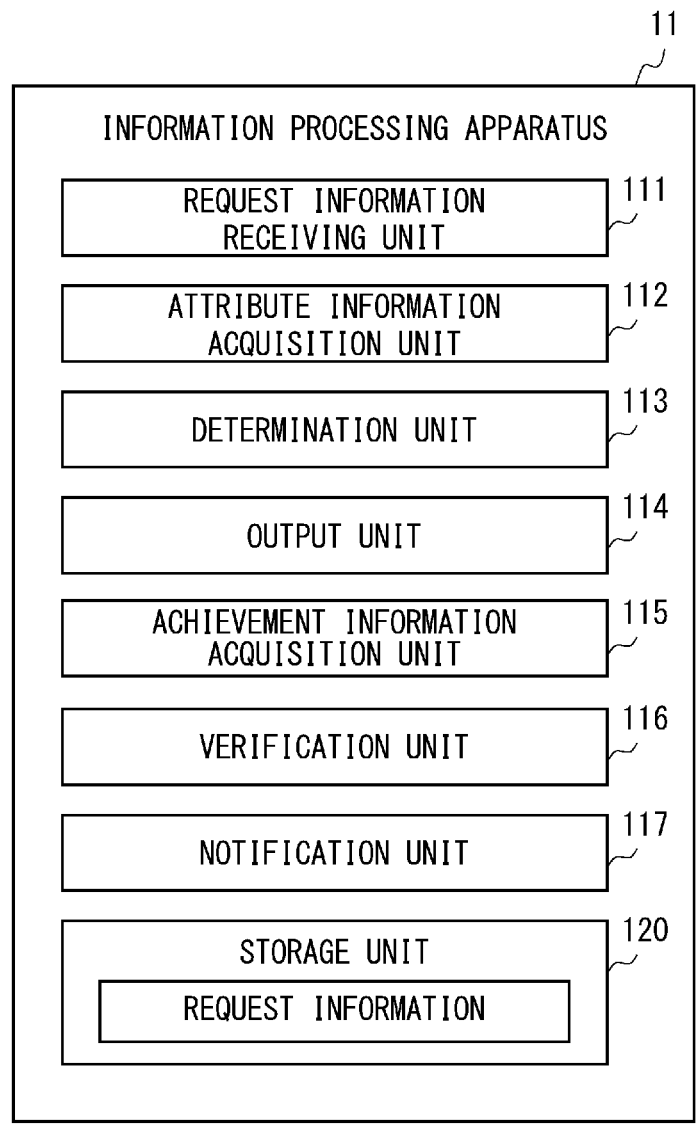
FIG. 4 is a block diagram of an information processing apparatus according to the second example embodiment.

Referring next to FIG. 4, the information processing apparatus 11 will be described. FIG. 4 is a block diagram of the information processing apparatus 11 according to the second example embodiment. The information processing apparatus 11 according to this example embodiment is different from the information processing apparatus 10 according to the first example embodiment in that the information processing apparatus 11 includes an achievement information acquisition unit 115, a verification unit 116, a notification unit 117, and a storage unit 120.

The request information receiving unit 111 receives qualification information including body information on the mobile body, administrator information on the mobile body, and user information on the mobile body, and plan information as request information. The request information receiving unit 111 may receive at least a part of the remote identification information of the mobile body 30 as request information. In this case, the remote identification information includes static information in at least the aforementioned body information, administrator information, and user information. Note that the static information of the remote identification information means a part of the remote identification information that is updated less frequently than dynamic information is. The static information includes, for example, the name or the weight of the mobile body, the name or the title of the administrator, the user's name, and the like.

The attribute information acquisition unit 112 according to this example embodiment acquires attribute information from the attribute information management apparatus 20. More specifically, the attribute information acquisition unit 112 transmits, for example, qualification information included in the request information received by the request information receiving unit 111 to the attribute information management apparatus 20. Accordingly, the attribute information acquisition unit 112 acquires the attribute information that corresponds to the transmitted qualification information from the attribute information management apparatus 20. The attribute information acquisition unit 112 supplies the acquired attribute information to the determination unit 113.

The determination unit 113 receives the body information, the administrator information, and the user information received by the request information receiving unit 111. Further, the determination unit 113 receives attribute information that corresponds to each of the body information, the administrator information, and the user information from the attribute information acquisition unit 112. Then, the determination unit 113 determines, from these information items, whether or not to accept a request. According to this configuration, the information processing apparatus 11 is able to determine, for example, whether or not to accept the request depending on the user's amount of experience using the attribute information. That is, the determination unit 113 may not accept a moving plan requested by a user who has relatively few hours of experience, whereas the determination unit 113 may accept the same moving plan requested by another user who has relatively many hours of experience. Further, for example, the determination unit 113 may determine whether or not to accept a request from an administrator in accordance with the number of mobile bodies managed by the administrator, the number of years that the administrator has managed mobile bodies, or the like. More specifically, for example, the determination unit 113 may determine that an administrator who manages a business whose size is relatively large is allowed to execute a moving plan which requires a larger number of mobile bodies operated per given area, whereas it may determine that an administrator who manages a business whose size is relatively small is not allowed to execute a moving plan which requires a large number of mobile bodies operated per given area. Further, for example, the determination unit 113 may determine whether or not to accept a request depending on the performance or properties of the mobile body 30. More specifically, for example, the determination unit 113 may determine that, if a mobile body has a relatively low resistance to maximum wind speed or a relatively low dust and water resistance, not to accept a request from this mobile body, whereas the determination unit 113 may determine, if a mobile body has a relatively high resistance to maximum wind speed or a relatively high dust and water resistance, to accept a request from this mobile body, even in a case in which weather conditions are more severe in the latter case than in the former case.

The determination unit 113 sets, for example, determination criteria for determining whether or not to accept a request depending on the attribute information. For example, the determination unit 113 sets the determination criteria by associating the number of the user experience hours with the level of difficulty of the moving task in the moving plan. Accordingly, for example, when the number of the user experience hours is relatively large, the determination unit 113 determines to accept a request including a moving task whose level of difficulty is relatively high. On the other hand, when the number of the user experience hours is relatively small, the determination unit 113 does not determine to accept a request including a moving task whose level of difficulty is relatively high. Note that the aforementioned level of difficulty of the moving task is defined, for example, according to the number of obstacles that exist in a moving course, the weather in the moving course on the planned date, or the like.

When the attribute information includes an evaluation score, the determination unit 113 may determine whether or not to accept a request depending on the evaluation score. The evaluation score is an index indicating an evaluation of a body, an administrator, or a user. That is, the determination unit 113 may determine, for example, to accept a moving plan in a place where the level of difficulty of the operation is relatively high when the evaluation score is relatively high. More specifically, for example, the determination unit 113 may accept a request regarding a moving plan made by a person whose evaluation score is relatively high, whereas the determination unit 113 may reject a request regarding the same moving plan made by another person whose evaluation score is relatively low. Alternatively, the determination unit 113 may accept a request made by a person having a relatively high evaluation score for an area where it is dangerous to operate a mobile body or there is an unfavorable operation condition such as bad weather, whereas the determination unit 113 may reject a request made by a person having a relatively low evaluation score for the same area. According to this processing, the information processing system 1 is able to efficiently determine whether or not to accept a request. Note that the information processing system 1 may acquire information used when the determination unit 113 determines whether or not to accept a request from an external apparatus, a system or the like that is not shown. The information that is used when the determination unit 113 determines whether or not to accept a request is, for example, information indicating a dangerous area, information indicating an entry prohibited area, information regarding an obstacle, weather information, and so on.

Further, the determination unit 113 compares the request information received by the request information receiving unit 111 with other request information stored in the storage unit 120, and determines whether or not the date and time, the place, and the like in moving plans conflict with each other. When the date and time and the place in the moving plans conflict with each other, the determination unit 113 may determine not to accept the request received by the request information receiving unit 111.

Further, the determination unit 113 may take into account, for example, the following conditions when it makes the aforementioned determination. The conditions are, for example, other moving plans registered in a predetermined air traffic control system, entry prohibited areas defined by a predetermined regulating authority, a predetermined local government or the like, prohibited areas defined from terrain information, or weather forecast information at the date and time corresponding to a moving plan.

The achievement information acquisition unit 115 acquires achievement information regarding an operation achievement of the mobile body regarding which the request has been accepted. That is, the achievement information acquisition unit 115 acquires achievement information on the mobile body 30 regarding which the moving plan has been accepted. More specifically, the achievement information acquisition unit 115 acquires achievement information from the remote identification information of the mobile body 30 acquired from the terminal apparatus 60 or other information sent from the mobile body 30. The achievement information is, for example, the position, the speed, the altitude, or the moving time of the mobile body 30 for each time.

The verification unit 116 collates the aforementioned achievement information with plan information included in the accepted request information. Then, the verification unit 116 verifies whether or not the achievement information is in accord with the plan information. The verification unit 116 collates the achievement information with the plan information to determine, for example, whether or not a moving time or position information on the mobile body 30 included in the achievement information is included in the range of the date and time of the movement or the moving place in the plan information.

The notification unit 117 notifies the administrator or the user of the mobile body of the result of the verification made by the verification unit 116. That is, for example, the verification unit 116 may send the result of the verification to the information processing terminal 50 via the network N1. Further, for example, the verification unit 116 may send the result of the verification to the terminal apparatus 60 via the network N1.

The storage unit 120, which is a storage apparatus including a non-volatile memory such as a flash memory or an SSD, stores request information received by the information processing apparatus 11. The request information stored in the storage unit 120 includes a plurality of different request information items associated with a plurality of different requesters.

Figure 5:
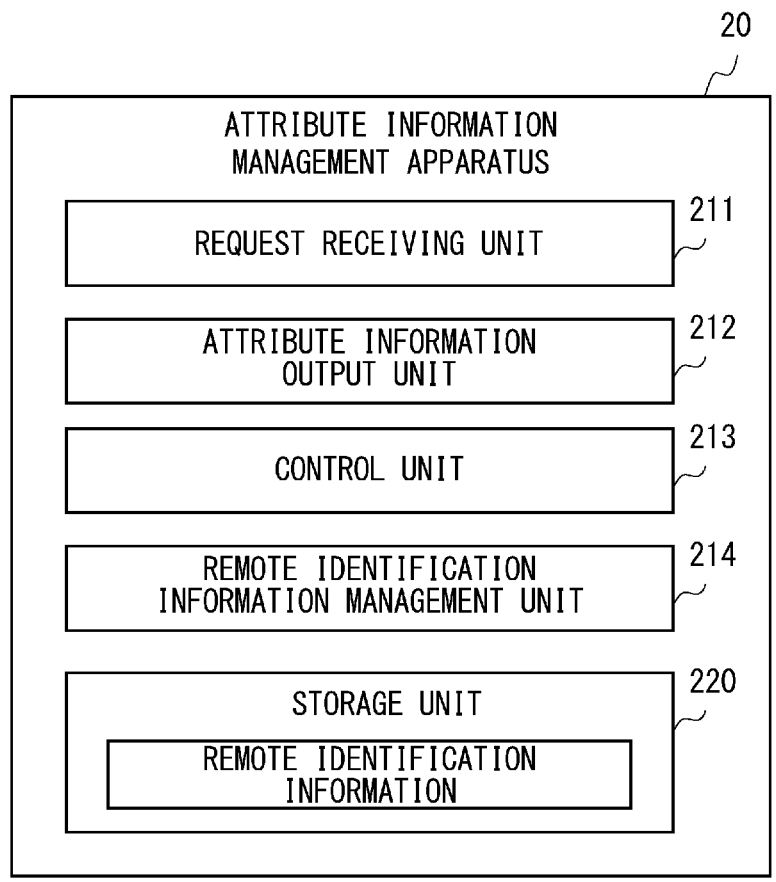
FIG. 5 is a block diagram of an attribute information management apparatus according to the second example embodiment.

Referring next to FIG. 5, the attribute information management apparatus will be described. FIG. 5 is a block diagram of the attribute information management apparatus 20 according to the second example embodiment. The attribute information management apparatus 20 mainly includes a request receiving unit 211, an attribute information output unit 212, a control unit 213, a remote identification information management unit 214, and a storage unit 220.

The request receiving unit 211 receives request signals from the information processing apparatus 11. The request signals from the information processing apparatus 11 are signals for requesting attribute information of predetermined qualification information. The request signals include information for determining the attribute information that should be supplied. For example, the request signals may include a part of the qualification information. In this case, information including a part of the qualification information may be encrypted. The attribute information output unit 212 outputs attribute information that corresponds to the request signals received by the request receiving unit 211.

The control unit 213 includes a computation apparatus such as a CPU, is connected to each of the components of the attribute information management apparatus 20, and controls each of these components. For example, when the request receiving unit 211 receives request signals, the control unit 213 reads out the corresponding attribute information from the storage unit 220 in accordance with the received signals, and causes the attribute information output unit 212 to output the attribute information that has been read out.

The remote identification information management unit 214 manages remote identification information. Specifically, for example, the remote identification information management unit 214 cooperates with the control unit 213, and registers, updates, and deletes the remote identification information. The remote identification information management unit 214 receives, for example, a request for registering the remote identification information from the administrator of the mobile body 30. In this case, the remote identification information management unit 214 receives remote identification information associated with the received request from the information processing terminal 50 of the administrator, and causes the storage unit 220 to store the received remote identification information. The storage unit 220 is a non-volatile memory such as a flash memory or an SSD, and stores at least the remote identification information.

Figure 6:
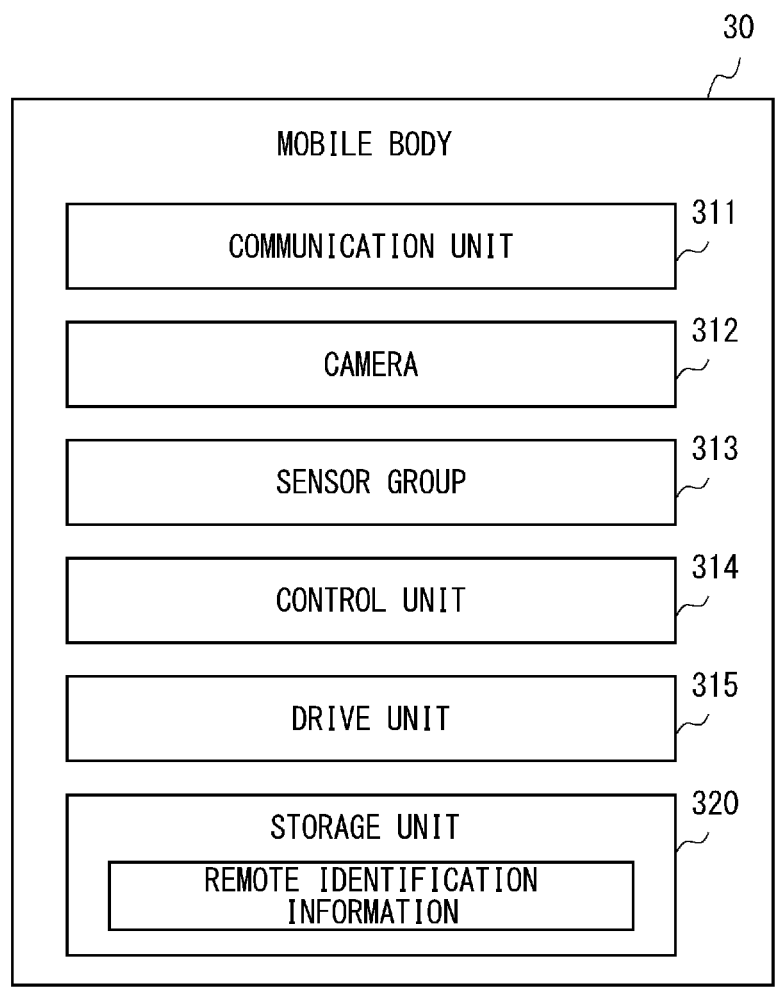
FIG. 6 is a block diagram of a mobile body according to the second example embodiment.

Referring next to FIG. 6, the mobile body 30 will be described. FIG. 6 is a block diagram of the mobile body 30 according to the second example embodiment. The mobile body 30 mainly includes a communication unit 311, a camera 312, a sensor group 313, a control unit 314, a drive unit 315, and a storage unit 320.

The communication unit 311 includes an interface for enabling connection with the manipulation terminal 40 in such a way that they can communicate wirelessly, and an interface for enabling connection with the information processing system 1 in such a way that they can communicate wirelessly. The camera 312 captures an image of surroundings for each preset period while the mobile body 30 is moving, and generates image data regarding the captured images. The image data regarding the images captured by the camera 312 is supplied to the manipulation terminal 40 via the communication unit 311.

The sensor group 313 indicates various sensors included in the mobile body 30. The sensor group 313 may include, for example, an antenna that acquires position information by a Global Navigation Satellite System (GNSS), a gyro sensor, a thermometer, a hygrometer or the like.

The control unit 314 includes a computation apparatus such as a CPU or an MCU and controls each of the components included in the mobile body 30. The drive unit 315, which is driven to enable the mobile body 30 to move, includes, for example, a motor for driving a drive unit used when the mobile body moves. The storage unit 320, which is a storage apparatus including a non-volatile memory such as a flash memory or an SSD, at least stores remote identification information.

Referring next to FIG. 7, remote identification information will be described. FIG. 7 is a diagram showing an example of the remote identification information. The remote identification information includes body information, administrator information, and user information.

The body information is information associated with the body itself of the mobile body 30. The body information includes dynamic information and static information. The dynamic information of the body information includes, for example, a total moving time, a repair history and the like. The static information of the body information includes, for example, a validity period of an operation qualification for operating the mobile body 30 in the body information, the body number, and the weight.

The administrator information is information associated with the administrator who manages the mobile body 30. The administrator information includes dynamic information and static information. The dynamic information of the administrator information includes, for example, a body operation achievement, the number of bodies that the administrator holds, and the like. The static information of the administrator information includes, for example, a validity period of a management qualification, the name or the title of the administrator, the address or the location of the administrator, and the like.

The user information is information associated with the user who uses (manipulates) the mobile body 30. The user information includes dynamic information and static information. The dynamic information of the user information includes, for example, a movement achievement, an accident history and the like of the user. The static information of the user information includes, for example, a validity period of a usage qualification, the user's name, the user's address, and the like.

Figure 8:
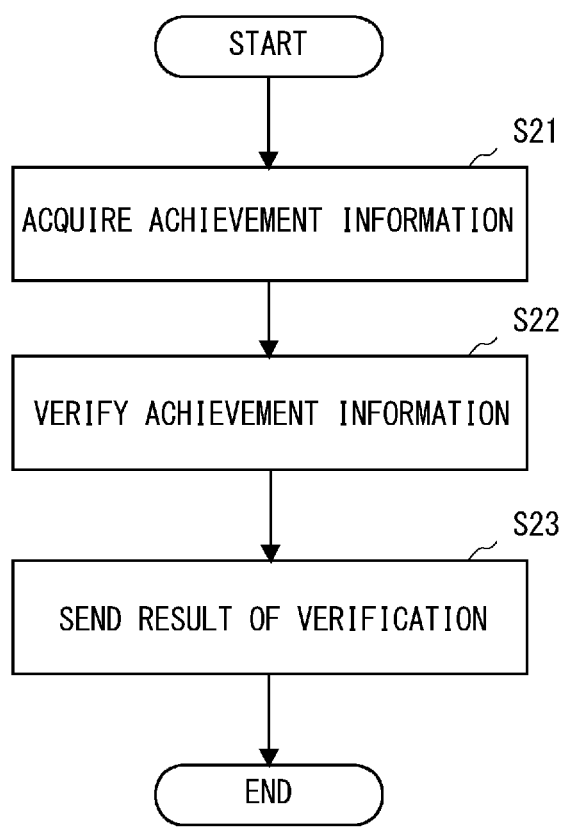
FIG. 8 is a flowchart of a verification method according to the second example embodiment.

Referring next to FIG. 8, a verification method of achievement data performed by the information processing apparatus 11 will be described. FIG. 8 is a flowchart of a verification method according to the second example embodiment. The information processing apparatus 11 according to this example embodiment performs, besides the processing shown in FIG. 2, the processing shown in FIG. 8. The flowchart shown in FIG. 8 is started, for example, when the information processing apparatus 11 has received achievement information from the terminal apparatus 60.

First, the achievement information acquisition unit 115 acquires achievement information from the terminal apparatus 60 (Step S21). The achievement information includes at least a part of the remote identification information that the terminal apparatus 60 has received from the mobile body 30. Further, the achievement information may include position information on the terminal apparatus 60, time information generated by the terminal information, or the like.

Next, the verification unit 116 verifies the achievement information (Step S22). Specifically, for example, the verification unit 116 searches the request information stored in the storage unit 120 using remote identification information included in the achievement information acquired by the achievement information acquisition unit 115. Then the verification unit 116 reads out the plan information included in the request information that corresponds to the acquired achievement information. Then, the verification unit 116 collates the acquired achievement information with the plan information that is read out. Accordingly, the verification unit 116 verifies whether or not the achievement information is in accord with the plan.

Next, the notification unit 117 notifies the terminal apparatus 60 of the result of the verification performed by the verification unit 116 (verification result) (Step S23). Accordingly, the information processing apparatus 11 is able to cause the user P3 who uses the terminal apparatus 60 to recognize whether or not the mobile body 30 operates as planned. After the aforementioned processing is ended, the information processing apparatus 11 ends the series of processing.

The second example embodiment has been described above. The information processing system 1 according to the second example embodiment uses the remote identification information, as described above. The remote identification information includes dynamic information. Therefore, the information processing system 1 is able to determine whether or not to accept a request using dynamic information in a flexible manner. For example, the information processing apparatus 11 may set a predetermined incentive regarding priorities for a procedure or permission in association with the request from dynamic information of the remote identification information associated with the request. More specifically, for example, the request procedure may be simplified for a requester who makes a relatively large number of requests that exceed a predetermined threshold. Further, since the information processing system 1 uses the remote identification information, it is possible to implement the aforementioned request procedure or processing of verification regarding an operation plan without performing complicated processing.

As described above, according to the second example embodiment, it is possible to provide an information processing apparatus, an information processing method, an information processing system, and a program for suitably processing information regarding an operation plan for operating a mobile body.

Third Example Embodiment

Figure 9:
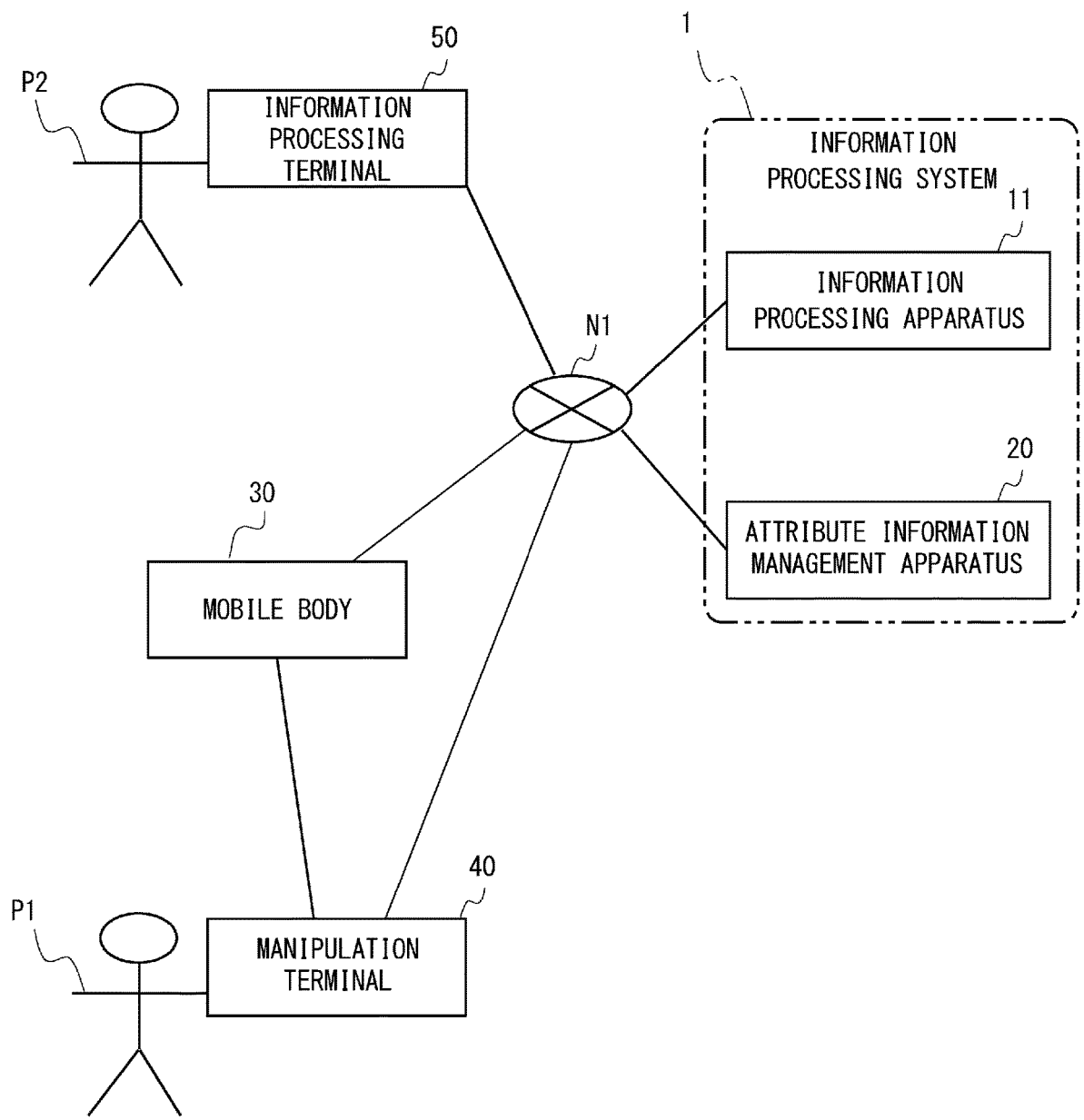
FIG. 9 is a block diagram showing an information processing system according to a third example embodiment.

Next, a third example embodiment will be described. In the third example embodiment, a mobile body 30 and a manipulation terminal 40 used by a user are each connected to an information processing system 1 via a network N1 in such a way that they can communicate with each other. Further, the function of a notification unit 117 included in an information processing apparatus 11 according to the third example embodiment is different from that according to the second example embodiment. FIG. 9 is a block diagram showing variations of the information processing system.

An achievement information acquisition unit 115 according to this example embodiment acquires achievement information from the mobile body 30. Accordingly, the information processing apparatus 11 is able to sequentially acquire achievement information without delay from the mobile body 30 which is in an operation state.

As a result of detection performed by a verification unit 116, when the achievement information is not in accord with plan information, the notification unit 117 of the information processing apparatus 11 according to this example embodiment requests a user P1 to correct an operation state. More specifically, the notification unit 117 transmits a signal for requesting the correction to the manipulation terminal 40 via the network N1. Note that the notification unit 117 may transmit a request for correcting the operation state or the result of the verification performed by the verification unit 116 to an information processing terminal 50 managed by an administrator P2.

The mobile body 30 according to this example embodiment is connected to the information processing system 1 via the network N1 in such a way that they can communicate with each other. Accordingly, the mobile body 30 which is being operated transmits the remote identification information stored in the mobile body 30 to the information processing system 1 via the network N1. Further, the mobile body 30 transmits position information of the mobile body 30 during the operation and information indicating the state of the mobile body 30 to the information processing system 1. That is, the mobile body 30 which is being operated supplies the achievement information to the information processing apparatus 11.

The manipulation terminal 40 according to this example embodiment is not only connected to the mobile body 30 in such a way that they can communicate with each other but also connected to the information processing system 1 via the network N1 in such a manner that they can communicate with each other. Accordingly, the manipulation terminal 40 is able to receive, for example, the result of the verification regarding the moving plan during the operation from the information processing system 1.

Figure 10:
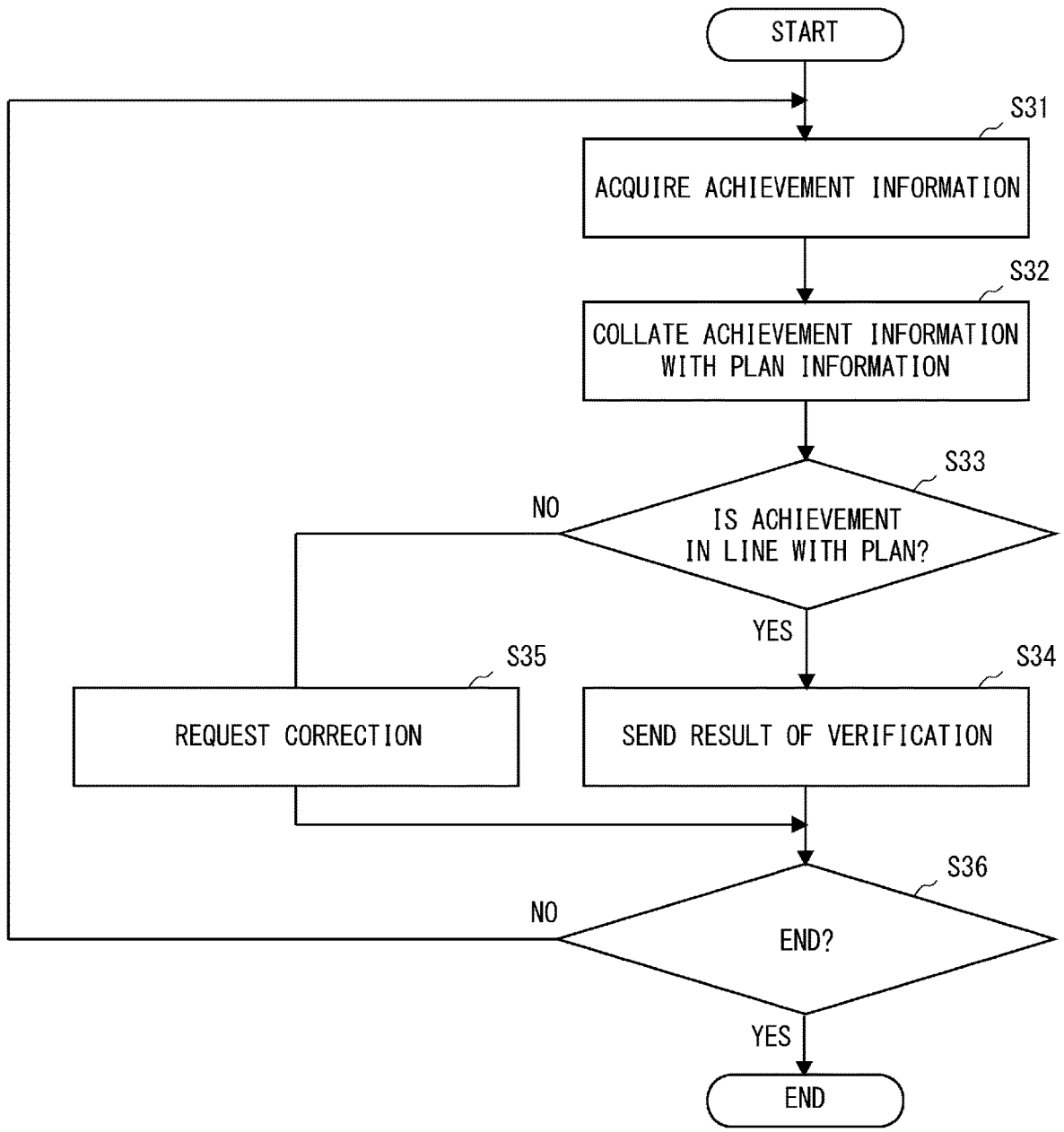
FIG. 10 is a flowchart of a verification method according to the third example embodiment.

Referring next to FIG. 10, a verification method of achievement data performed by the information processing apparatus 11 will be described. FIG. 10 is a flowchart of a verification method according to the third example embodiment. The flowchart shown in FIG. 10 is started when, for example, the information processing apparatus 11 has received achievement information from the mobile body 30.

First, the achievement information acquisition unit 115 acquires achievement information from the mobile body 30 (Step S31). The achievement information includes at least a part of remote identification information of the mobile body 30. The achievement information includes position information, time information, and the like.

Next, the verification unit 116 collates the achievement information with the plan information (Step S32). Specifically, for example, the verification unit 116 searches for request information stored in the storage unit 120 using the remote identification information regarding the achievement information acquired by the achievement information acquisition unit 115, and reads plan information of the request information that corresponds to the acquired achievement information. Then, the verification unit 116 collates the achievement information with the plan information in order to verify the acquired achievement information.

Next, the verification unit 116 determines whether or not the achievement information is in accord with the plan associated with the request information (Step S33). When it is determined that the achievement information is in accord with the plan (Step S33: YES), the information processing apparatus 11 proceeds to Step S34. On the other hand, when it is not determined that the achievement information is in accord with the plan (Step S33: NO), the information processing apparatus 11 proceeds to Step S35.

In Step S34, the notification unit 117 of the information processing apparatus 11 sends the result of the verification including information indicating that the achievement information is in accord with the plan to the manipulation terminal 40 (Step S34). Next, the information processing apparatus 11 proceeds to Step S36.

In Step S35, the notification unit 117 of the information processing apparatus 11 sends a message for requesting correction to the manipulation terminal 40 along with information indicating that the moving plan during the operation is not in accord with the plan (Step S35). Next, the information processing apparatus 11 proceeds to Step S36.

In Step S36, the information processing apparatus 11 determines whether or not the series of processing is ended (Step S36). The series of processing is ended when, for example, achievement information is not sent from the mobile body 30 or when information indicating that the moving plan during the operation has been completed has been received from the mobile body 30 or the manipulation terminal 40. When it is determined that the series of processing is ended (Step S36: YES), the information processing apparatus 11 ends the series of processing. On the other hand, when it is not determined that the series of processing will be ended (Step S36: NO), the information processing apparatus 11 returns to Step S31.

The third example embodiment has been described above. Note that, in the aforementioned information processing system 1, the information processing apparatus 11 and the attribute information management apparatus 20 may be managed by entities different from each other and may cooperate with each other. Further, in the information processing system 1, the information processing apparatus 11 and the attribute information management apparatus 20 may be connected to each other via a network other than the network N1 or communication means. Further, in the information processing system 1, the information processing apparatus 11 and the attribute information management apparatus 20 may be one apparatus that functions integrally.

The contents of the aforementioned remote identification information, dynamic information and the static information are not limited to the aforementioned ones. For example, the body information, the administrator information, and the user information included in the remote identification information, the dynamic information, and the static information may be managed separately from one another. Further, for example, the remote identification information, the dynamic information, and the static information may include only one of the body information, the administrator information, and the user information.

The aforementioned notification unit 117 may send, in addition to a request for correction to be made by the notification unit 117, a request for stopping the operation to, for example, a drone that is moving significantly deviated from the plan.

As described above, according to the third example embodiment, it is possible to provide an information processing apparatus, an information processing method, an information processing system, and a program for suitably managing qualification information.

Figure 11:
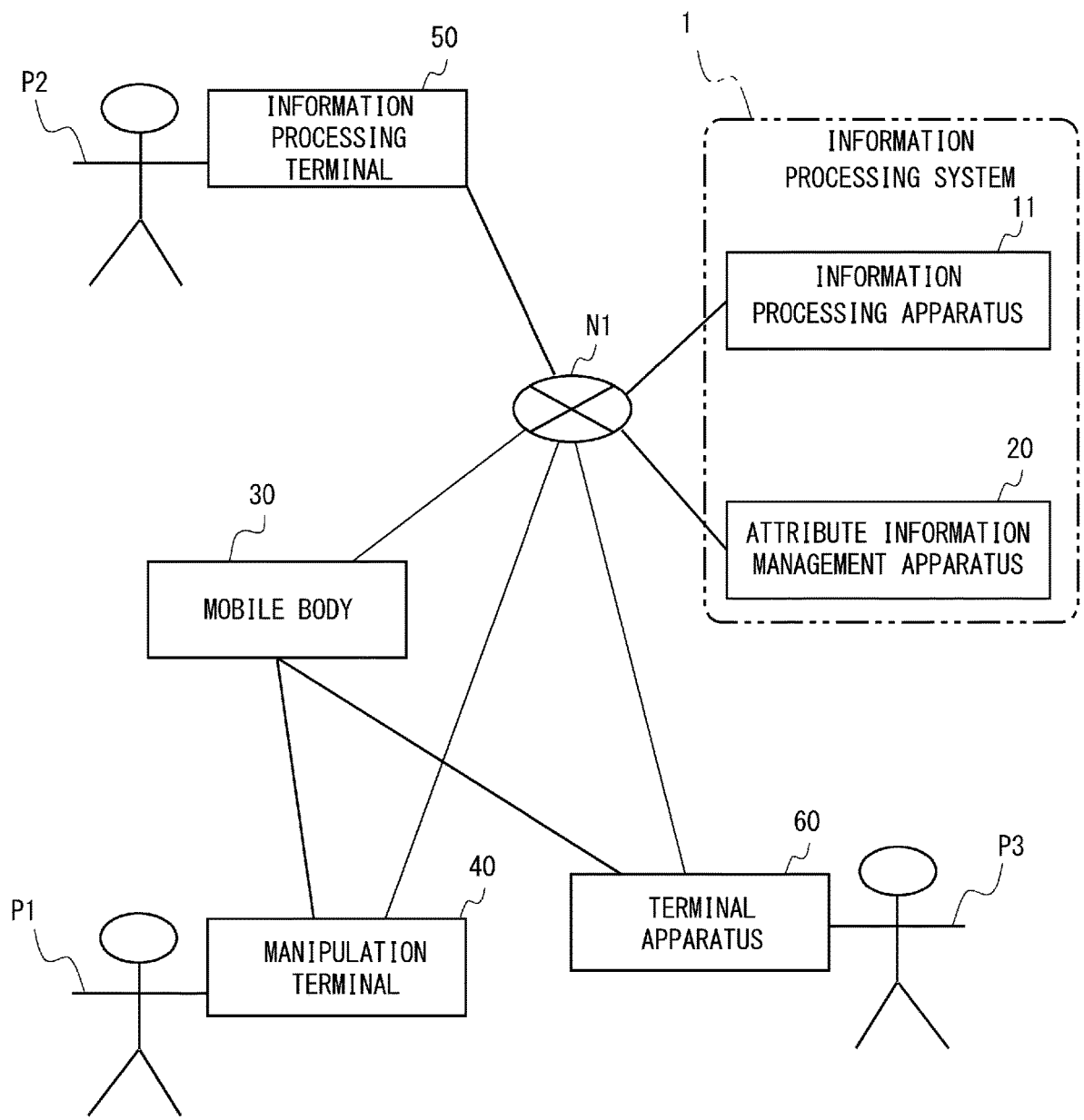
FIG. 11 is a block diagram showing an information processing system according to a modification example of the third example embodiment.

Referring next to FIG. 11, a modification example of the third example embodiment will be described. FIG. 11 is a block diagram showing an information processing system according to the modification example of the third example embodiment. The block diagram shown in FIG. 11 includes, besides the components shown in the block diagram in FIG. 9, the terminal apparatus 60 shown in FIG. 3.

Upon receiving a predetermined instruction from the manipulation terminal 40 used by the user P1, the mobile body 30 performs a motion such as a movement in accordance with the received instruction. The mobile body 30 transmits remote identification information or other predetermined information regularly while moving.

Further, the mobile body 30 is connected to the information processing system 1 via the network N1 in such a way that they can communicate with each other. Accordingly, the mobile body 30 which is being operated transmits the remote identification information stored in the mobile body 30 to the information processing system 1 via the network N1. Further, the mobile body 30 transmits the position information of the mobile body 30 during the operation or information indicating the state of the mobile body 30 to the information processing system 1. That is, the mobile body 30 which is being operated supplies the achievement information to the information processing apparatus 11.

As described above, the mobile body 30 is able to send remote identification information to the terminal apparatus 60. Further, the mobile body is able to transmit the remote identification information to the information processing system 1 via the network N1. The mobile body 30 may supply the remote identification information to the information processing system 1 by these two methods.

The manipulation terminal 40 is not only connected to the mobile body 30 in such a way that they can communicate with each other but also connected to the information processing system 1 via the network N1 in such a manner that they can communicate with each other. Accordingly, the manipulation terminal 40 is able to receive, for example, a result of verification regarding the moving plan during the operation from the information processing system 1.

The terminal apparatus 60 receives signals sent by the mobile body 30. The signals sent by the mobile body 30 include remote identification information on the mobile body 30. The signals sent by the mobile body 30 may also include position information of the mobile body 30 or other information indicating the state of the mobile body 30. The terminal apparatus 60 transmits the remote identification information received from the mobile body 30 to the information processing system 1 via the network N1.

The modification example shown in FIG. 11 has been described above. According to the modification example of the third example embodiment, it is possible to provide an information processing apparatus, an information processing method, an information processing system, and a program for suitably managing qualification information.

The aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

<Example of Hardware Configuration>

Hereinafter, a case in which each functional configuration of the information processing apparatus and the static information management apparatus according to the present disclosure is implemented by a combination of hardware with software will be described.

Figure 12:
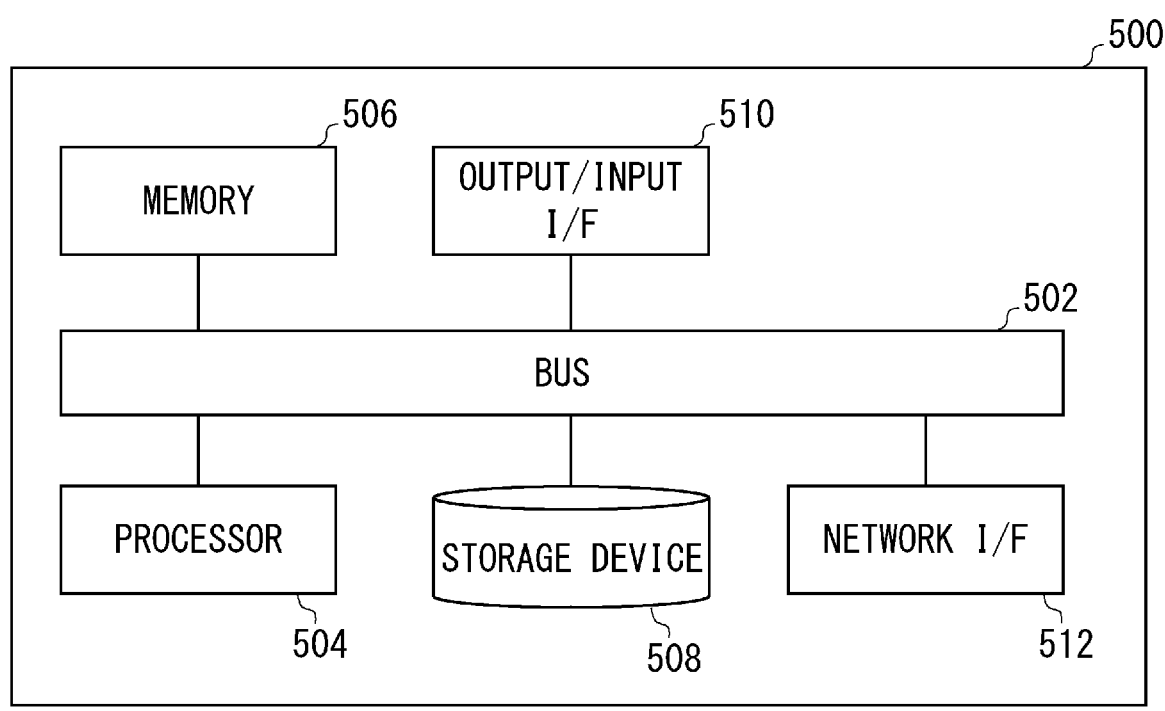
FIG. 12 is a block diagram illustrating a hardware configuration of a computer.

FIG. 12 is a block diagram illustrating a hardware configuration of a computer. The information processing apparatus and the static information management apparatus according to the present disclosure can implement the aforementioned functions by a computer 500 including a hardware configuration shown in FIG. 12. The computer 500 may be a portable computer such as a smartphone or a tablet terminal or may be a stationary computer such as a PC. The computer 500 may be a special-purpose computer designed to implement each of the apparatuses, or may be a general-purpose computer. The computer 500 is able to implement a desired function as a predetermined application is installed therein.

The computer 500 includes a bus 502, a processor 504, a memory 506, a storage device 508, an input/output interface (I/F) 510, and a network interface (I/F) 512. The bus 502 is a data transmission path for enabling the processor 504, the memory 506, the storage device 508, the input/output interface 510, and the network interface 512 to transmit and receive data among them. However, the method for connecting the processor 504 and the like to one another is not limited to the bus connection.

The processor 504 may be any type of processor such as a CPU, a GPU or an FPGA. The memory 506 is a main memory unit that is implemented using a Random Access Memory (RAM) or the like.

The storage device 508 is an auxiliary storage device that is implemented with a hard disk, an SSD, a memory card, or a Read Only Memory (ROM). The storage device 508 stores a program for achieving a desired function. The processor 504 loads this program into the memory 506 to execute the loaded program, thereby implementing each functional configuration unit of each apparatus.

The input/output interface 510 is an interface for connecting the computer 500 to an input/output device. An input device such as a keyboard and an output device such as a display device are connected, for example, to the input/output interface 510.

The network interface 512 is an interface for connecting the computer 500 to a network.

Note that the present invention is not limited to the aforementioned example embodiments and may be changed as appropriate without departing from the spirit of the present invention.

This application is based upon and claims the benefit of priority from Japanese Patent Application No. 2021-062052, filed on Mar. 31, 2021, the disclosure of which is incorporated herein in its entirety by reference.

REFERENCE SIGNS LIST

1 INFORMATION PROCESSING SYSTEM
10 INFORMATION PROCESSING APPARATUS
11 INFORMATION PROCESSING APPARATUS
20 ATTRIBUTE INFORMATION MANAGEMENT APPARATUS
30 MOBILE BODY
40 MANIPULATION TERMINAL
50 INFORMATION PROCESSING TERMINAL
60 TERMINAL APPARATUS
111 REQUEST INFORMATION RECEIVING UNIT
112 ATTRIBUTE INFORMATION ACQUISITION UNIT
113 DETERMINATION UNIT
114 OUTPUT UNIT
115 ACHIEVEMENT INFORMATION ACQUISITION UNIT
116 VERIFICATION UNIT
117 NOTIFICATION UNIT
120 STORAGE UNIT
211 REQUEST RECEIVING UNIT
212 ATTRIBUTE INFORMATION OUTPUT UNIT
213 CONTROL UNIT
214 REMOTE IDENTIFICATION INFORMATION MANAGEMENT UNIT
220 STORAGE UNIT
311 COMMUNICATION UNIT
312 CAMERA
313 SENSOR GROUP
314 CONTROL UNIT
315 DRIVE UNIT
320 STORAGE UNIT
500 COMPUTER
502 BUS
504 PROCESSOR
506 MEMORY
508 STORAGE DEVICE
510 OUTPUT/INPUT I/F
512 NETWORK I/F

What is claimed is:

1. An information processing apparatus comprising:
at least one memory configured to store instructions; and
at least one processor configured to execute the instructions to:
receive request information including qualification information regarding an operation qualification for operating a mobile body and plan information regarding an operation plan for operating the mobile body;
acquire attribute information of the qualification information, the attribute information including a manipulation skill of a user;
operating the mobile body to determine, based on a manipulation skill required for a region where the mobile body is operated, the region being associated with the request information, and the manipulation skill of the user included in the attribute information, whether or not to accept a request associated with the request information;
output a result of the determination regarding the request as a response to the request; and
control operation of the mobile body based on the output result.

2. The information processing apparatus according to claim 1, wherein the at least one processor is further configured to execute the instruction to receive the qualification information including body information on the mobile body, administrator information on the mobile body, and user information on the mobile body as the request information.

3. The information processing apparatus according to claim 2, wherein the at least one processor is further configured to execute the instruction to determine whether or not to accept the request based on the attribute information corresponding to each of the body information, the administrator information, and the user information.

4. The information processing apparatus according to claim 1, wherein the at least one processor is further configured to execute the instruction to set a criterion for determining whether or not to accept the request depending on the attribute information.

5. The information processing apparatus according to claim 1, wherein the at least one processor is further configured to execute the instructions to:
- acquire achievement information regarding an operation achievement of the mobile body regarding which the request has been accepted; and
- collate the achievement information with the plan information and verifying whether not the achievement information is in accord with the plan information.

6. The information processing apparatus according to claim 5, wherein the at least one processor is further configured to execute the instruction to:
- notify an administrator or a user of the mobile body of a result of the verification.

7. An information processing system comprising:
- the information processing apparatus according to claim 1; and
- an attribute information management apparatus configured to manage the attribute information of the qualification information.

8. An information processing method, wherein a computer executes processing comprising:
- receiving request information including qualification information regarding an operation qualification for operating a mobile body and plan information regarding an operation plan for operating the mobile body;
- acquiring attribute information of the qualification information, the attribute information including a manipulation skill of a user;
- operating the mobile body to determine, based on a manipulation skill required for a region where the mobile body is operated, the region being associated with the request information, and the manipulation skill of the user included in the attribute information, whether or not to accept a request associated with the request information;
- outputting a result of the determination regarding the request as a response to the request; and
- controlling operation of the mobile body based on the output result.

9. The information processing method according to claim 8, wherein the processing further comprises:
- receiving the qualification information including body information on the mobile body, administrator information on the mobile body, and user information on the mobile body as the request information.

10. The information processing method according to claim 9, wherein the processing further comprises:
- determining whether or not to accept the request based on the attribute information corresponding to each of the body information, the administrator information, and the user information.

11. The information processing method according to claim 8, wherein the processing further comprises:
- setting a criterion for determining whether or not to accept the request depending on the attribute information.

12. The information processing method according to claim 8, wherein the processing further comprises:
- acquiring achievement information regarding an operation achievement of the mobile body regarding which the request has been accepted; and
- collating the achievement information with the plan information and verifying whether not the achievement information is in accord with the plan information.

13. The information processing method according to claim 12, wherein the processing further comprises:
- notifying an administrator or a user of the mobile body of a result of the verification.

14. A non-transitory computer readable medium storing a program for causing a computer to execute processing comprising:
- receiving request information including qualification information regarding an operation qualification for operating a mobile body and plan information regarding an operation plan for operating the mobile body;
- acquiring attribute information of the qualification information, the attribute information including a manipulation skill of a user;
- operating the mobile body to determine, based on a manipulation skill required for a region where the mobile body is operated, the region being associated with the request information, and the manipulation skill of the user included in the attribute information, whether or not to accept a request associated with the request information;
- outputting a result of the determination regarding the request as a response to the request; and
- controlling operation of the mobile body based on the output result.

15. The non-transitory computer readable medium according to claim 14, wherein the processing further comprises:
- receiving the qualification information including body information on the mobile body, administrator information on the mobile body, and user information on the mobile body as the request information.

16. The non-transitory computer readable medium according to claim 15, wherein the processing further comprises:
- determining whether or not to accept the request based on the attribute information corresponding to each of the body information, the administrator information, and the user information.

17. The non-transitory computer readable medium according to claim 14, wherein the processing further comprises:
- setting a criterion for determining whether or not to accept the request depending on the attribute information.

18. The non-transitory computer readable medium according to claim 14, wherein the processing further comprises:
- acquiring achievement information regarding an operation achievement of the mobile body regarding which the request has been accepted; and
- collating the achievement information with the plan information and verifying whether not the achievement information is in accord with the plan information.

19. The non-transitory computer readable medium according to claim 18, wherein the processing further comprises:
- notifying an administrator or a user of the mobile body of a result of the verification.

* * * * *